United States Patent [19]
Imaino et al.

[11] Patent Number: 6,088,194
[45] Date of Patent: Jul. 11, 2000

[54] DUAL MODE ACTUATOR

[75] Inventors: Wayne Isami Imaino, San Jose; Matthew T. White, Campbell, both of Calif.

[73] Assignee: International Business Machines Corporation, Armonk, N.Y.

[21] Appl. No.: 09/097,193

[22] Filed: Jun. 12, 1998

[51] Int. Cl.[7] ................................. G11B 5/55; G11B 5/56
[52] U.S. Cl. .......................... 360/106; 360/109; 360/104
[58] Field of Search .................................... 360/104–106, 360/109

[56] References Cited

U.S. PATENT DOCUMENTS

| | | | |
|---|---|---|---|
| 4,258,400 | 3/1981 | Lazzari | 360/103 |
| 4,456,936 | 6/1984 | Steen et al. | 360/104 |
| 5,027,240 | 6/1991 | Zarouri et al. | 360/104 |
| 5,268,805 | 12/1993 | Peng et al. | 360/106 |
| 5,521,778 | 5/1996 | Boutaghou et al. | 360/106 |
| 5,726,834 | 3/1998 | Eckberg et al. | 360/106 |
| 5,896,246 | 4/1999 | Budde et al. | 360/104 |
| 5,905,608 | 5/1999 | Frees et al. | 360/106 |

OTHER PUBLICATIONS

Kobayashi, M., MR–46 carriage acceleration feedback multi–sensing controller for sector servo systems, International Conf. on Micromechatronics for Info. and Precision Equipment, Tokyo, Jul. 20–23, 1997.

*Primary Examiner*—William J. Klimowicz
*Attorney, Agent, or Firm*—Lumen Intellectual Property Services

[57] ABSTRACT

A dual mode actuator has an arm assembly mounted on a pivot. The arm assembly has a first arm with a first proximal flex region next to the pivot and a distal flex region at the other end of the arm and a second arm with a second proximal flex region next to the pivot and a second distal flex region at the other end of the second arm. The two arms are joined at their distal ends by a terminal piece equipped with a controlled element, such as an optical or magnetic read-write head or a sensor. A control mechanism which can include VCM coils, MEMs, piezoelectric elements or the like is provided to drive the arm assembly and cause it to execute two motions: rotation about the pivot and flexing at the proximal and distal flex regions which causes the terminal piece to rotate. thus adjusting the position of the controlled element. The rotation about the pivot and rotation of the terminal piece adjust the position of the controlled element.

16 Claims, 6 Drawing Sheets

DUAL MODE ACTUATOR

FIELD OF THE INVENTION

This invention relates generally to actuator systems and in particular to an actuator arm assembly architecture designed to accommodate rotary and flexing motions.

BACKGROUND OF THE INVENTION

Actuator systems using arm assemblies enjoy extensive application in the field of data storage. Typical storage systems feature controlled elements, e.g., transducer heads, mounted on arm assemblies which are displaced by the actuator to enable the controlled element to access and/or record information in the storage medium. This type of storage system is particularly well-suited for optical and magnetic storage on disk-shaped or tape-type memory media.

Increasing densities of data stored in the media translate into higher track pitch which requires more precise actuator systems operating over a large bandwidth while maintaining stability and robustness. Present actuator systems experience several problems which limit their ability to satisfy these requirements.

The first set of problems is due to mechanical resonances of the arm structure. These vibrational modes include the natural modes of the actuator and those of any intervening mechanical components. With increasing mechanical complexity, the vibrational modes of any given actuator system become difficult to predict. The problem is further compounded as the operating frequency of the actuator system is increased. The vibrational modes limit the control loop gain and/or the bandwidth of the servo system. This causes the controlled element to experience excessive settling time after positioning, poor rejection of disturbances, poor tracking ability, or any combination of these.

The second set of problems is due to the high track pitch. Actuator systems capable of accessing closely spaced data tracks generally exhibit increased mechanical complexity. In particular, reduced tracking misregistration is often achieved with compound or dual-stage actuators. These types of actuators are commonly found in optical storage devices such as Compact Disks or DVD drives. Unfortunately, dual-stage actuators require a separate actuator for each stage. This translates into more electrical connections, greater operating voltages, a more complex control method and higher cost of fabrication and assembly. In addition, the mechanical complexity typically adds to the resonance related problems mentioned above.

To address the first set of problems, prior art systems have attempted to ensure stable operation of actuator systems by stabilizing the control loop. This has been done by inserting gain stabilizing filters such as electronic notch filters in the control loop path. These filters are placed generally in the downstream portion of the control loop to filter out the signal information within the band reject frequency range of the notch and thus help minimize excitation of these actuator vibrational modes.

Another technique for damping vibrational modes of a servo control system was presented by Masahito Kobayashi et al. in "MR-46 Carriage Acceleration Feedback Multi-Sensing Controller for Sector Servo Systems," at the International Conference on Micromechtronics for Information and Precision Equipment, Tokyo, Jul. 20–23, 1997. This proposed multi-sensing control system uses accelerometers to generate acceleration feedback. An acceleration feedback controller receives the feedback signals and compensates the servo to eliminate the mechanical resonance modes. Although Kobayashi's technique has been demonstrated, it can not be efficiently implemented without the use of notch filters. Furthermore, designing the feedback controller requires the designer to model the very complicated transfer function Hd(s) of the servo-controlled system.

The prior art also teaches gain stabilization through low-pass filtering in the control loop. In this approach the cutoff frequency of a low-pass filter that is inserted in the control loop is generally lower than the frequencies of any of the lightly damped resonances of the actuator structure. Thus, the components of the control signal at or near the resonance frequency are effectively prevented from exciting the vibrational modes of the actuator structure. Depending on the frequencies, this method helps ensure system stability. However, this approach also increases the phase shift at frequencies in the vicinity of the servo loop's unity gain crossing, thereby requiring the reduction of the bandwidth to maintain stability of the servo system. This drawback applies to gain stabilizing filters, including notch filters. The reduction in bandwidth and the reduction in the loop gain that generally accompanies it, in turn, reduces the ability of the servo system to correct errors and negatively affects tracking performance such as run out and other disturbances that are due to external excitation and non-linearities in positioning operations.

The problems associated with dual-stage actuator structure have not been sufficiently addressed by the prior art. Specifically, no presently known techniques allow the simplification of the dual-stage mechanical structure and the associated complexity of the control electronics.

OBJECTS AND ADVANTAGES

Accordingly, it is a primary object of the present invention to provide an actuator system which overcomes the disadvantages of the prior art by reducing the arm assembly's susceptibility to vibrational modes within its range of operation. In particular, it is an object of the invention to increase the bandwidth of the actuator to permit faster data access times. Simultaneously, the actuator design is intended to eliminate the typical vibrational modes of the actuator encountered in prior art systems.

Another object of the invention is to reduce the mechanical complexity of the actuator. Specifically, the actuator system of the invention eliminates the need for dual-stage actuators with separate control stages. Furthermore, the electrical connections and the associated control electronics are simplified.

Yet another object of the invention is to provide an actuator system which is easy to fabricate and low-cost.

These and other advantages of the invention will become apparent upon reading the detailed description.

SUMMARY

These objects and advantages are attained by a dual mode actuator which has an arm assembly mounted on a pivot. The arm assembly is made of two arms. A first arm has a first proximal flex region next to the pivot and a distal flex region at the other end of the first arm. A second arm, like the first arm, also has a proximal flex region next to the pivot and a distal flex region at the other end of the second arm. The two arms are joined at their distal ends by a terminal piece. A control mechanism is provided to drive the arm assembly and cause it to execute two motions: rotation about the pivot and flexing at the proximal and distal flex regions. The flexing causes the terminal piece to rotate.

Typically, terminal piece is equipped with a controlled element, such as an optical or magnetic read-write head, an accelerometer or other sensors. Hence, rotation about the pivot and rotation of the terminal piece adjust the position of the controlled element.

The control mechanism typically includes a VCM coil mounted on the arm assembly. The VCM coil directly controls the rotary and flexing movements of the arm assembly based on a control current. The control mechanism can actually have two VCM coils; a first coil for applying a rotation control signal and a second VCM coil for applying a flexing control signal. In this way the rotary and flexing motions of the arm assembly can be independently controlled. The VCM coil or coils are preferably mounted in a cradle. When two coils are used the smaller one, e.g., the coil controlling the flexing, can be mounted within the coil controlling the rotation. Of course, other types of control mechanisms besides VCM coils can also be used as control mechanisms.

The distal and proximal flex regions are preferably made of a predetermined material which does not experience fatigue within the range of the flexing motion. In other words, within the flex range the material of the flex regions operates below its fatigue threshold and the number of flexing cycles which the material can support approaches infinity. This can be ensured when the proximal and distal flex regions are made up of tapered or narrowed portions of the arms and the rotation of the terminal piece is limited to 1 miliradian. Suitable materials for making the arms include ferrous alloys and polymeric plastics.

The method for driving the dual mode actuator relies on properly controlling the rotation of the arm assembly about the pivot and the flexing of the arms at their flex regions. In order to ensure that the flexing does not induce fatigue the rotation of the terminal piece should be restricted to a maximum rotation of 1 miliradian. This will ensure that the fatigue inducing threshold is not reached.

Moreover, the flexing motion at the flex regions is best induced by applying a force in the plane of the arm assembly, e.g., by using a VCM. Because the force is in the plane of the arm assembly it will not excite any regular bending modes of the entire arm assembly but rather a high frequency compressional mode.

A detailed description of the invention is provided in the detailed description below in reference to the appended drawing figures.

DETAILED DESCRIPTION

Figure 1:
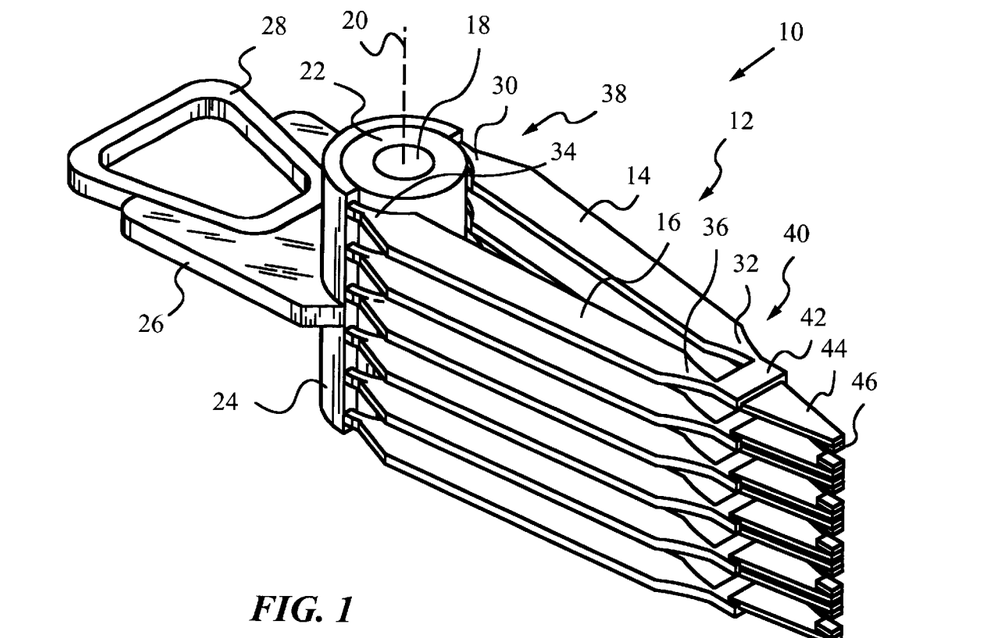
FIG. 1 is an isometric view of an actuator system according to the invention.

A preferred embodiment of a dual-mode actuator system 10 according to the invention is shown in FIG. 1. Actuator system 10 has six arm assemblies 12 mounted one above the other to accommodate five double-sided storage media units, e.g. magnetic or optical disks (not shown), between them. Of course, the number of arm assemblies 12 will vary depending on how many disks there are in the storage device in which actuator system 10 is implemented.

Each arm assembly 12 has a first arm 14 and a second arm 16 and is mounted around a pivot 18 which defines an axis of rotation 20. Rotary motion about pivot 18 is ensured by a rotary bearing 22 to which arm assemblies 12 are attached by a one-sided support 24. Specifically, arm assemblies 12 are joined to bearing 22 on the side opposite arms 14, 16.

There is also a cradle 26 joined to support 24 opposite arms 14, 16. Cradle 26 holds a VCM coil 28 for applying a force to arm assemblies 12. For this purpose, coil 28 is positioned in a magnetic field generated by a pair of magnets (not shown) Altering the current flow through coil 28 generates the required force, as is well-known in the art.

As indicated on the topmost arm assembly 12, both arms 14, 16 have areas of flexibility 38, 40 at each end. In particular, first arm 14 has a first proximal flex region 30 where it joins with support 24 next to pivot 18 and a first distal flex region 32 at its far end. Similarly, second arm 16 has a second proximal flex region 34 at its juncture with support 24 next to pivot 18 and a second distal flex region 36 at its far end. In this case flex regions 30, 32, 34 and 36 are simply narrowed portions of arms 14, 16. However, ensuring flexibility in areas 38, 40 can also be achieved by varying the material composition of arms 14, 16 at flex regions 30, 32, 34 and 36. Suitable materials for arms 14, 16 and flex regions 30, 32, 34 and 36 is selected from among ferrous alloys and polymeric plastics.

A terminal piece 42 joins arms 14, 16 at distal flex regions 32 and 36. A suspension 44 carrying a transducer 46 such as a read-write head is mounted on suspension 44. Alternatively, suspension 44 may simply be an extension of piece 42. Transducer 46 is appropriately selected to cooperate with the type of storage media used in the storage device. In the event of an optical system transducer 46 is an optical read-write head. Transducer 46 is a magnetic read-write head when a magnetic storage medium is employed. In other systems transducer 46 can be an accelerometer for providing motion data or any other sensor as required by the specific application of system 10.

Figure 2:
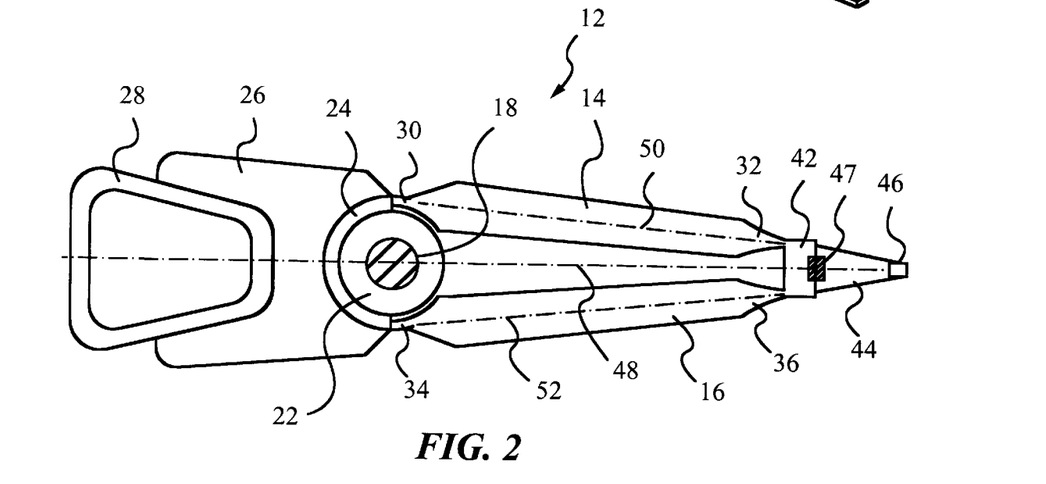
FIG. 2 is a top plan view of an arm assembly of the actuator system shown in FIG. 1.

FIG. 2 shows a top plan view of one arm assembly 12 to better illustrate the geometrical relationship of arms 14, 16. Arm assembly 12 is symmetrical about a center line 48. Moreover, each arm 14, 16 also has a center line 50, 52 inclined at an angle to center line 48. For example, a guideline for the design can be derived from the standard kinematic relationship of a modified 4-bar linkage. In this case the inclination of center lines 50, 52 with respect to center line 48 is such that:

$$\tan\phi = \frac{d}{2l},$$

where $\phi$ is the angle that center lines 50 and 52 make with respect to center line 48, d is the distance between distal flex regions 32 and 36 and l is the length of suspension 44. The symmetry of arm assembly 12 and in particular the symmetric arrangement of arms 14, 16 with respect to center line 48 is important for proper operation of arm assembly 12 as described below.

During operation a force is applied to arm assembly 12 by adjusting the current flowing through VCM coil 28. The force acts in the plane of arm assembly 12 and consists of a low frequency component causing rotation of assembly 12 about pivot 18 and a high frequency component causing bending or flexing of arm assembly 12 at flex regions 30, 32, 34 and 36.

Figure 3:
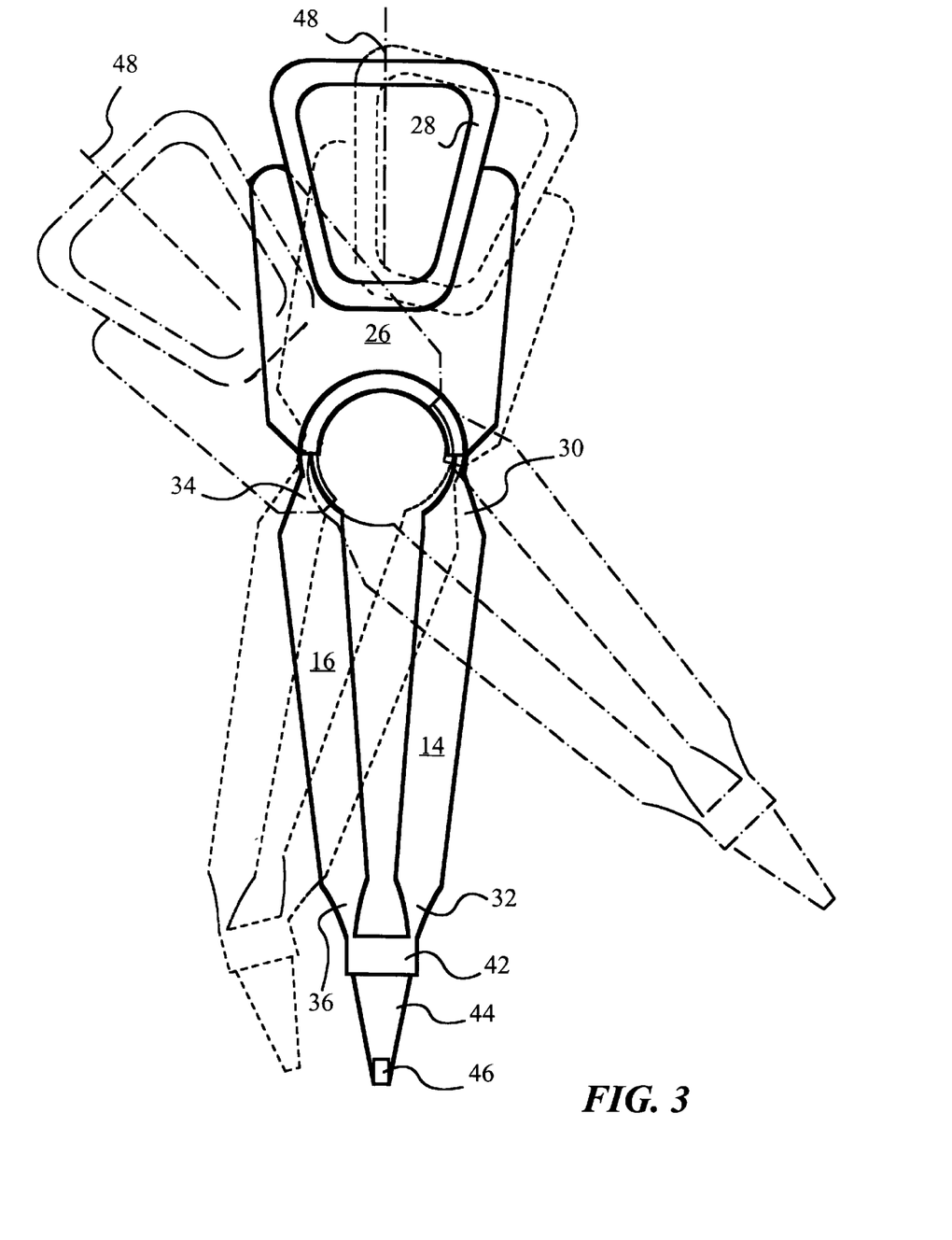
FIG. 3 is a top plan view illustrating rotation and flexing of the arm assembly.

FIG. 3 illustrates the rotational and flexing motions of arm assembly 12. The low frequency force component, generally in the range from 0 to 10 Newtons, causes arm assembly 12 to rotate about pivot 18 resulting in an angular displacement of suspension 44. A rotated position of arm assembly 12 is indicated in dashed and dotted lines. Generally, such rotary displacement is used for relatively large adjustments, e.g., moving read-write head 46 between data tracks of a storage medium.

The high frequency force component, generally also in the range from 0 to 10 Newtons, causes arms 14, 16 to bend at flex regions 30, 32, 34 and 36 in phase with the rotary displacement of arm assembly 12. The result of this bending is a rotation of terminal piece 42 and consequent displacement of transducer 46, as indicated by the dotted lines in FIG. 3. The motion of arms 14, 16 is small enough to prevent flex regions 30, 32, 34 and 36 from bending beyond the fatigue inducing threshold of the material but large enough to create sufficient rotary motion of suspension 44.

To ensure that the flexing does not induce fatigue failure at flex regions 30, 32, 34 and 36, the rotation of terminal piece 42 should preferably be restricted to a range between 0 and 1 miliradians. Thus, even if suspension 44 is very short, e.g. 10 mm, a 1 miliradian rotation produces a sufficient 10 micron displacement of transducer 46. The materials of arms 14, 16 have an endurance limit such that for oscillating stresses below this limit the lifetime is essentially infinite.

Figure 6:
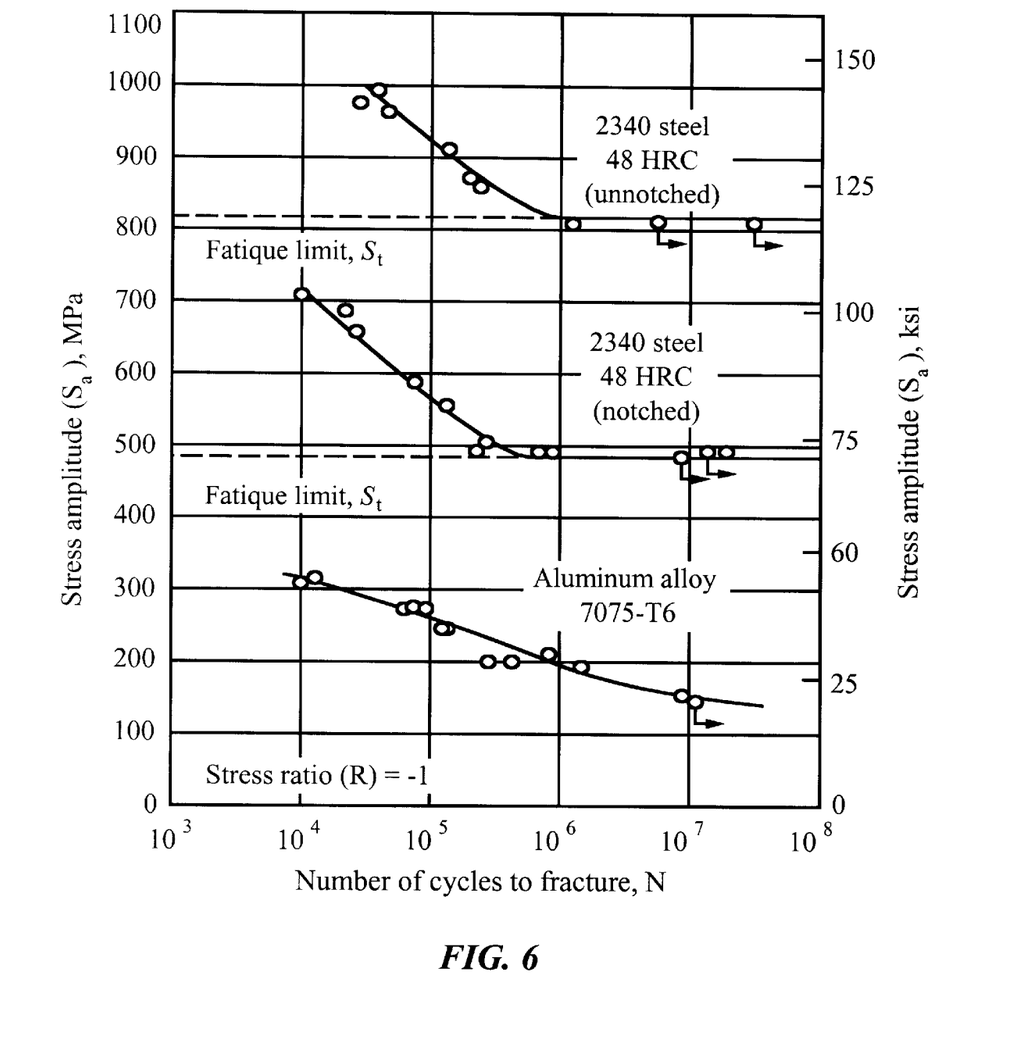
FIG. 6 is a graph illustrating the stress amplitude vs. number of cycles to fracture for select alloys.
Figure 7:
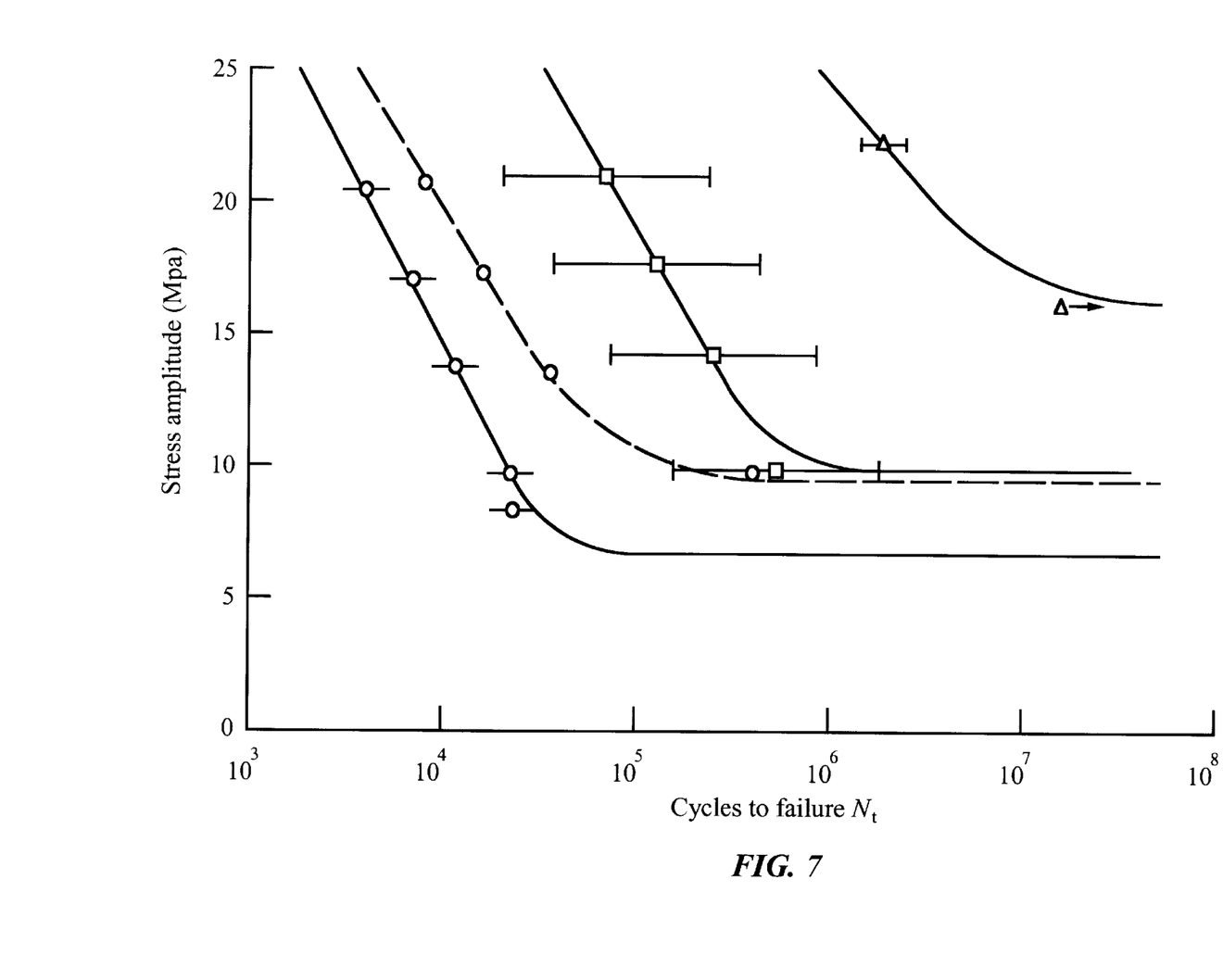
FIG. 7 is a graph illustrating the stress amplitude vs. number of cycles to failure for select plastics.

The graphs in FIGS. 6 and 7 show the stress amplitude vs. the number of cycles to failure or fracture for selected alloys and plastic samples which can be used as materials for arms 14, 16. FIG. 6 illustrates the curves for constant amplitude and sinusoidal loading of two steel and one aluminum alloy. FIG. 7 shows the results of the same test for four polystyrene samples of different molecular weights (MW) coded as follows: full circles—$1.6 \times 10^5$, empty circles—$2.74 \times 10^5$, full squares—$8.6 \times 10^5$, and full triangles—$2 \times 10^6$. The solid lines indicate a narrow MW distribution while the dashed lines indicate a broad MW distribution.

Clearly, for stress amplitudes below the endurance limit the graphs become flat and the number of cycles which the material can withstand becomes very large or nearly infinite. For many materials the endurance limit is approximately 1/1,000 to 1/10,000 of the material's Young's modulus. This places a limit on the allowable deformation of flex regions 30, 32, 34, and 36. Thus, not only the width but also the thickness of flex regions 30, 32, 34, and 36 has to be adjusted based on the material characteristics. For this purpose flexing regions 30, 32, 34, and 36 can be assumed to undergo pure bending and the stress in them is thus given by:

$$\frac{\sigma_z}{E} = \frac{d}{2R},$$

where $\sigma_z$ is the maximum stress, E is Young's modulus, d is the thickness of the flexing region and R is the radius of curvature. In terms of angular deflection, θ, required the equation can be rewritten as:

$$\frac{\sigma_z}{E} = \frac{d\theta}{\Delta},$$

where Δ is the linear extent of the flexible region. Hence for $\sigma_z/E \leq 10^{-3}$, d must be approximately equal to Δ, or be slightly smaller.

As a precaution, the flex regions 30, 32, 34, and 36 can be designed to limit their range of motion to keep the stresses they experience below the endurance limit. This can be achieved by including suitable stops or other mechanical features on arms 14, 16 at flex regions 30, 32, 34, and 36.

The above guidelines in conjunction generally known material properties allow a person of average skill in the art to properly design arms 14, 16 for any choice of materials.

The rotary motion of suspension 44 is used for precision adjustments, e.g., keeping read-write head 46 centered over a data track of a storage medium. A total displacement of head 46 by 1 μm or less in the tracking direction is sufficient for these purposes especially in view of the increasing track density.

While the rotational motion of suspension 44 is small compared to the rotation of entire arm assembly 12 it can be performed rapidly to accommodate active tracking control. In addition to the coil 28 further control elements such as piezoelectric devices or MEMs can be mounted, e.g, on suspension 44, to further control the motion of transducer 46. These elements are small, light and do not affect the rotational and vibrational motions of arms 14, 16. Furthermore, these devices and their operation are known in the art and they are easily integrated in a system according to the present invention. FIG. 2 indicates the position of a piezoelectric element 47 on arm assembly 12. In fact, system 10 with control of element 47 is a preferred embodiment.

Figure 4:
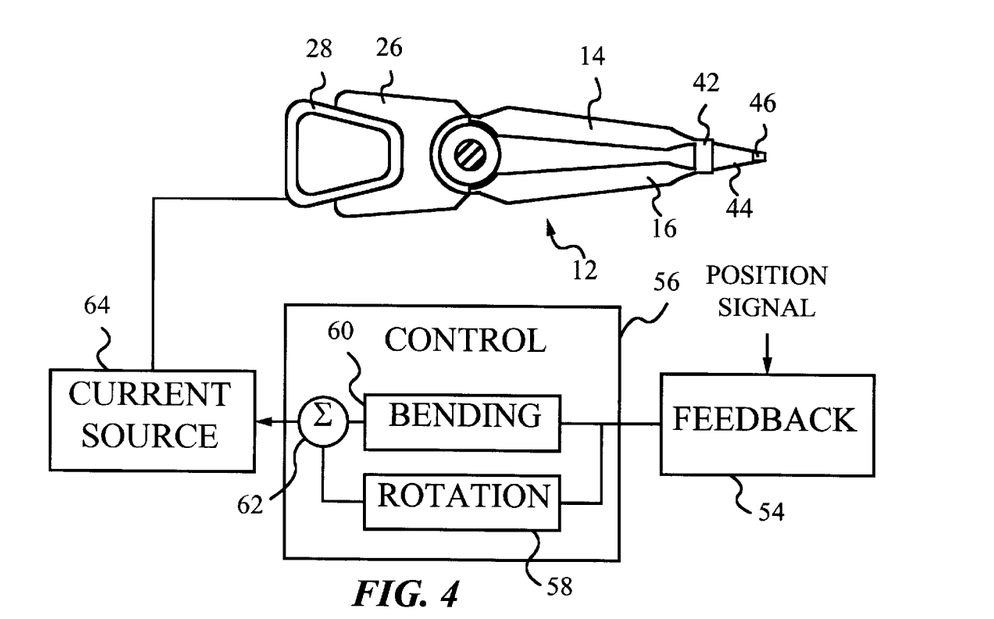
FIG. 4 is a schematic diagram showing a control mechanism for driving the actuator system of FIG. 1.
Figure 5:
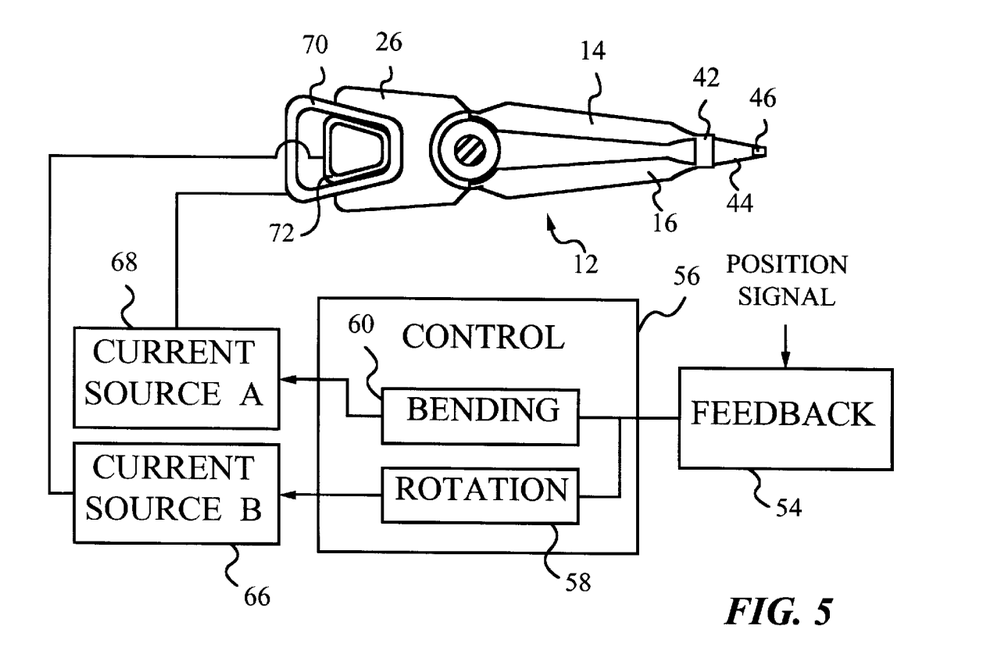
FIG. 5 is a schematic diagram showing another control mechanism for driving the actuator system of FIG. 1.

The schematic diagrams in FIGS. 4 and 5 illustrate two arrangements for controlling the force delivered by VCM coil 28. It should be noted that a computer with appropriate software rather than dedicated circuitry can be used to perform the functions described.

In the arrangement of FIG. 4 a feedback 54 receives a position signal from transducer 46 and relays it to a control 56. Control 56 has a rotation control circuit 58 and a bending control circuit 60. Based on the tracking requirements for transducer 46, circuits 58 and 60 calculate the required rotary motion of arm assembly 12 and the in-phase rotation of suspension 44. The resulting control signals are combined by element 62 and relayed to a current source 64. Source 64 is connected to VCM coil 28 and translates the control signals from circuits 58, 60 into an appropriate control current. The control current is converted by VCM coil 28 into the appropriate low and high frequency force components to drive the rotation and bending movements of arm assembly 12. A frequency-weighted design and allocation of the control effort by frequency can be practiced in this embodiment.

A particular frequency-weighted design and allocation of the control effort by frequency type of control is exercised by the arrangement of FIG. 5 which is analogous to that of FIG. 4 and the same reference numbers are used to designate corresponding parts. Here, the control signals from rotation and bending control circuits 58, 60 are not combined but are sent instead to separate current sources 66 and 68. Sources 66, 68 generate two currents respectively; one to drive the rotation and one to drive the bending of arm assembly 12.

Rather than a single VCM coil cradle 26 holds a first VCM coil 70 and a smaller second VCM coil 72 mounted within first VCM coil 70. First VCM coil 70 is connected to source 66 and receives the current which drives the rotation of arm assembly 12. Second VCM coil 72 is connected to source 68 and receives the current which induces bending at flex regions 30, 32, 34, and 36 and corresponding rotation of terminal piece 42. In this manner, the low and high frequency force components are decoupled and applied by coils 70, 72 respectively. Of course, a person of average skill in the art will be able to design many equivalent electrical circuits for controlling the movements of arm assembly 12 including appropriate software for implementing computer assisted control.

The construction of dual mode actuator 10 is such that the in plane force applied by VCM coil 28 or VCM coils 70, 72 induces a compression of arms 14, 16 rather than general bending not at flex regions 30, 32, 34, and 36 as experienced in prior art actuators. Compressional modes have much higher frequencies than bending modes. Hence, the range of operation of dual mode actuator 10 is extended to higher frequencies. This increase in bandwidth translates to improved disturbance rejection and faster response to control signals, i.e., control signals from circuits 58, 60.

Figure 8:
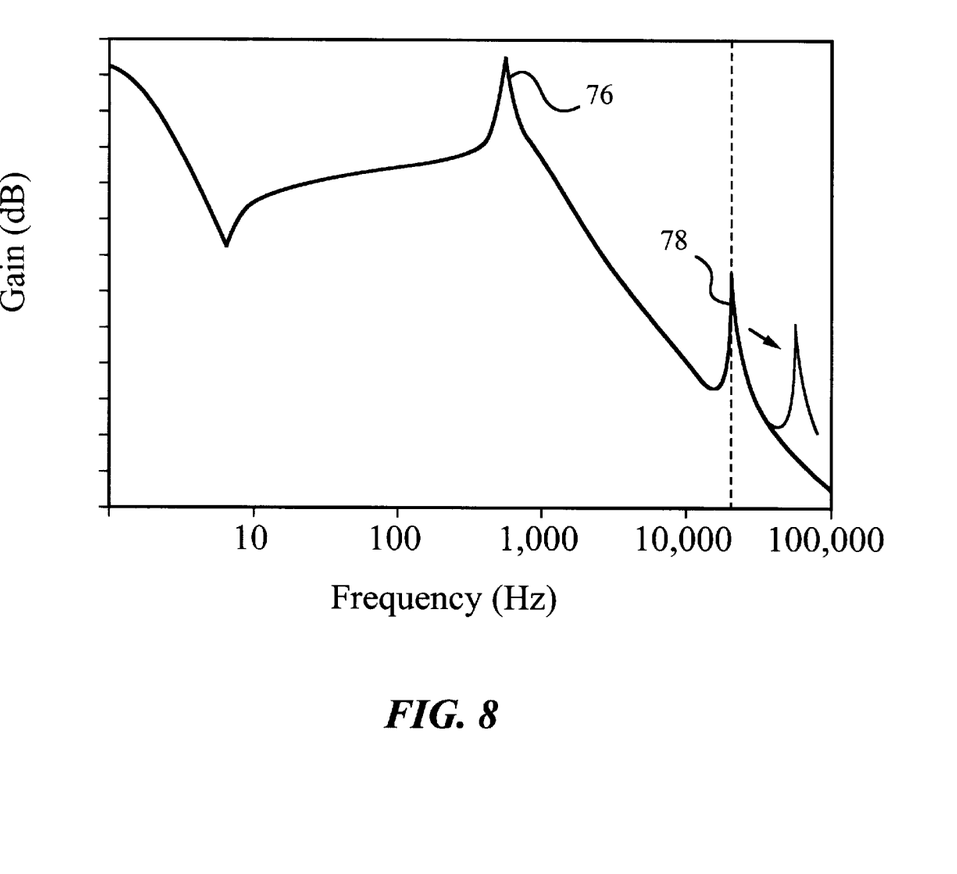
FIG. 8 is a graph of the transfer function from actuator coil to the controlled element in the actuator system of the invention.

In particular, dual mode actuator 10 has only two resonances between 100 Hz and 100 kHz as illustrated by its transfer function graphed in FIG. 8. Specifically, after a main spring-mass mode 76 encountered between 700–800 Hz a second mode 78 does not occur until about 30 kHz. In contrast, a prior art actuator experiences a first resonance near 3–4 kHz.

The high frequency of mode 78 is due to the symmetry of arm assembly 12 about center line 48, symmetry of areas of flexibility 38, 40 with respect to center line 48 and one sided support 24 of arm assembly 12 on bearing 22. Furthermore, precise alignment of the force such that it is applied exactly along center lines 50, 52 of arms 14, 16 will further displace second mode 78 to frequencies as high as 100 kHz as indicated in the graph of FIG. 8.

Having to take into account only resonances 76 and 78 greatly simplifies controller design and there is less opportunity for modeling errors which degrade the performance, and even the stability of the controller design. Additionally, in a prior art system, the first critical mode contributes −180 degrees to the phase of the frequency response. Meanwhile, the first critical frequency of dual mode actuator 10, namely resonance 78, contributes +180 degrees to the phase of the frequency response. This makes mode 78 much easier to stabilize and control.

Furthermore, the mechanical complexity and electrical wiring requirements of dual mode actuator 10 are reduced because it does not require dual stage actuators with separate suspensions. As a result, the fabrication of actuator 10 is straightforward and low-cost.

Although the detailed description contains many specifics for the purposes of illustration, anyone of ordinary skill in the art will appreciate that many variations and alterations to the following details are within the scope of the invention. Accordingly, the scope of the invention should be determined by the following claims and their legal equivalents.

What is claimed is:

1. A dual mode actuator comprising:
   a) a pivot;
   b) an arm assembly mounted on said pivot and having:
      1) a first arm having a first proximal flex region next to said pivot and a first distal flex region;
      2) a second arm having a second proximal flex region next to said pivot and a second distal flex region;
      3) a terminal piece joining said first distal flex region and said second distal flex region; and
   c) a control means for rotating said arm assembly about said pivot, and for flexing said arm assembly at said proximal flex regions and at said distal flex regions to cause rotation of said terminal piece.

2. The dual mode actuator of claim 1 wherein said control means comprise an actuator selected from the group consisting of piezoelectric devices, MEMs and VCM coils.

3. The dual mode actuator of claim 1 further comprising a controlled element mounted on said terminal piece.

4. The dual mode actuator of claim 3 wherein said controlled element is a read-write head.

5. The dual mode actuator of claim 4 wherein said read-write head is an optical read-write head.

6. The dual mode actuator of claim 4 wherein said read-write head is a magnetic read-write head.

7. The dual mode actuator of claim 3 wherein said controlled element is an accelerometer.

8. The dual mode actuator of claim 1 wherein said control means comprise a first VCM coil for applying a rotation control signal to cause said rotation of said arm assembly and a second VCM coil for applying a flexing control signal for causing said flexing of said arm assembly.

9. The dual mode actuator of claim 8 further comprising a cradle for holding said first VCM coil and said second VCM coil.

10. The dual mode actuator of claim 1 wherein said proximal flex regions and said distal flex regions comprise narrowed portions of said first arm and said second arm.

11. The dual mode actuator of claim 1 wherein said arms comprise a material selected from the group consisting of ferrous alloys and polymeric plastics.

12. A method of controlling a dual mode actuator comprising an arm assembly having a first arm and a second arm, said arm assembly being mounted on a pivot, said method comprising the following steps:
   a) providing said first arm with a first proximal flex region next to said pivot and a first distal flex region;
   b) providing said second arm with a second proximal flex region next to said pivot and a second distal flex region;
   c) joining said first distal flex region and said second distal flex region by a terminal piece;
   d) rotating said arm assembly about said pivot; and
   e) flexing said arm assembly at said proximal flex regions and at said distal flex regions to cause rotation of said terminal piece.

13. The method of claim 12 wherein said flexing step comprises a rotation of said terminal piece up to 1 miliradian.

14. The method of claim 12 wherein said flexing step comprises flexing said proximal flex regions and said distal flex regions below the fatigue inducing threshold.

15. The method of claim 12 wherein said flexing step comprises applying a force in the plane of said arm assembly.

16. The method of claim 12 wherein said dual mode actuator further comprises a control means for performing said rotating step and said flexing step and said method further comprises sending a rotation control signal and a flexing control signal to said control means.

* * * * *